US012667888B2

(12) United States Patent
Gao

(10) Patent No.: US 12,667,888 B2
(45) Date of Patent: *Jun. 30, 2026

(54) METHODS FOR IN SITU FORMATION OF DISPERSOIDS STRENGTHENED REFRACTORY ALLOY IN 3D PRINTING AND ADDITIVE MANUFACTURING

(71) Applicant: Addman Intermediate Holdings, LLC, Fort Myers, FL (US)

(72) Inventor: Youping Gao, Thousand Oaks, CA (US)

(73) Assignee: Addman Intermediate Holdings, LLC, Fort Myers, FL (US)

( * ) Notice: Subject to any disclaimer, the term of this patent is extended or adjusted under 35 U.S.C. 154(b) by 232 days.

This patent is subject to a terminal disclaimer.

(21) Appl. No.: 18/070,869

(22) Filed: Nov. 29, 2022

(65) Prior Publication Data
US 2023/0108204 A1     Apr. 6, 2023

Related U.S. Application Data

(63) Continuation-in-part of application No. 17/024,625, filed on Sep. 17, 2020, now Pat. No. 11,519,063.
(Continued)

(51) Int. Cl.
*B22F 10/28*       (2021.01)
*B22F 10/322*      (2021.01)
(Continued)

(52) U.S. Cl.
CPC ............ *B22F 10/28* (2021.01); *B22F 10/322* (2021.01); *B23K 26/342* (2015.10); *B33Y 10/00* (2014.12);
(Continued)

(58) Field of Classification Search
CPC .... B22F 10/28; B22F 10/322; B22F 2201/02; B22F 2201/03; B22F 2301/20;
(Continued)

(56) References Cited

U.S. PATENT DOCUMENTS 4,921,531 A * 5/1990 Nagle ................. C01B 21/0765
                                                            423/440
5,049,355 A     9/1991 Gennari et al.
(Continued)

FOREIGN PATENT DOCUMENTS

CN        114871450 A     8/2022
EP          3368312 A1    9/2018
(Continued)

OTHER PUBLICATIONS

Mohamed S. El-Genk et.al. ["A review of refractory metal alloys and mechanically alloyed-oxide dispersion strengthened steels for space nuclear power systems" Journal of Nuclear Materials 340 (2005) 93-112] (Year: 2005).*
(Continued)

*Primary Examiner* — Sally A Merkling
*Assistant Examiner* — Nazmun Nahar Shams
(74) *Attorney, Agent, or Firm* — Banner & Witcoff, Ltd.

(57)            ABSTRACT

Methods of fabricating objects using additive manufacturing are provided. The methods create in situ dispersoids within the object. The methods are used with refractory alloy powders which are pretreated to increase the oxygen content to between 500 ppm and 3000 ppm or to increase the nitrogen content to between 250 ppm and 1500 ppm. The pretreated powders are then formed into layers in an environmentally controlled chamber of an additive manufacturing machine. The environmentally controlled chamber is adjusted to have between 500 ppm and 200 ppm oxygen. The layer of pretreated powder is then exposed to a transient moving energy source for melting and solidifying the layer; and creating in situ dispersoids in the layer.

14 Claims, 4 Drawing Sheets

Related U.S. Application Data

(60) Provisional application No. 62/901,633, filed on Sep. 17, 2019.

(51) Int. Cl.

| | |
|---|---|
| *B23K 26/342* | (2014.01) |
| *B33Y 10/00* | (2015.01) |
| *B33Y 70/00* | (2020.01) |

(52) U.S. Cl.
CPC ........... *B33Y 70/00* (2014.12); *B22F 2201/02* (2013.01); *B22F 2201/03* (2013.01); *B22F 2301/20* (2013.01)

(58) Field of Classification Search
CPC ......... B22F 10/20; B22F 10/38; B33Y 10/00; B33Y 70/00; C22C 1/045; C22C 1/059
See application file for complete search history.

(56) References Cited

U.S. PATENT DOCUMENTS

| | | | |
|---|---|---|---|
| 5,374,393 | A | 12/1994 | Gettliffe et al. |
| 10,105,798 | B2 | 10/2018 | Szuromi et al. |
| 10,711,332 | B2 | 7/2020 | Ibe et al. |
| 10,851,251 | B2 | 12/2020 | Fedynyshyn et al. |
| 2006/0156958 | A1 | 7/2006 | Simmons et al. |
| 2018/0044798 | A1 | 2/2018 | Walker |
| 2018/0126650 | A1 | 5/2018 | Murphree et al. |
| 2018/0193916 | A1* | 7/2018 | Lou ..................... C22C 32/0036 |
| 2020/0391292 | A1 | 12/2020 | Shuck et al. |
| 2021/0079511 | A1 | 3/2021 | Gao |
| 2021/0101344 | A1 | 4/2021 | Fornos Martinez et al. |
| 2022/0288676 | A1 | 9/2022 | Cauchy et al. |
| 2023/0108204 | A1 | 4/2023 | Gao |

FOREIGN PATENT DOCUMENTS

| | | | | |
|---|---|---|---|---|
| FR | 2506335 | A1 * | 11/1982 | ............. C22C 1/056 |
| WO | 2017/075258 | A1 | 5/2017 | |
| WO | 2020122992 | A1 | 6/2020 | |

OTHER PUBLICATIONS

Qilin Guo, et.al. ["Transient dynamics of powder spattering in laser powder bed fusion additive manufacturing process revealed by in-situ high-speed high energy x-ray imaging", Acta Materialia 151 (2018) 169-180]. (Year: 2018).*

J M Maximov et.al. [FR2506335A1] ( machine translation) (Year: 1982).*

* cited by examiner

METHODS FOR IN SITU FORMATION OF DISPERSOIDS STRENGTHENED REFRACTORY ALLOY IN 3D PRINTING AND ADDITIVE MANUFACTURING

CROSS-REFERENCE TO RELATED APPLICATION

This application is a continuation-in-part application of co-pending U.S. patent application Ser. No. 17/024,625, filed on Sep. 17, 2020 for "Methods for In Situ Formation of Dispersoids Strengthened Refractory Alloy in 3D Printing and Additive Manufacturing," the disclosure of which is hereby incorporated by reference, including the drawing.

BACKGROUND OF THE INVENTION

1. Field of the Invention

The present invention generally relates to processes for additive manufacturing for producing dispersoids strengthened materials (e.g., oxides and/or nitrides enriched powders and/or processed additives under enriched oxygen and/or nitrogen), and additively manufacturing materials produced by these processes.

2. Prior Art

In general, refractory alloys are mostly solid solution strengthened (substitutional strengthened) and are very sensitive to contamination from interstitial elements such as oxygen, nitrogen and carbon, to name a few. The most popular refractory alloy in the aerospace industry is Niobium Alloy C103 (Nb-10Hf-1Ti). Other refractory alloys include but are not limited to Niobium (Nb), Rhenium (Re), Tantalum (Ta), Molybdenum (Mo) and Tungsten (W) to name a few. When concentrations of interstitial elements are above certain limits, such as $O_2 \geq 350$ ppm and/or $N_2 \geq 0.100$ ppm, the refractory alloys properties degrade significantly. For example, refractory alloys may experience embrittlement and/or loss of ductility, which will significantly degrade the material.

The main reason for the degradation of refractory alloys in the face of contamination is due to the following: A) The interstitial elements did not form stable oxides and/or nitrides; B) The interstitial elements are not in the size range where cohesive strengthening can be provided; and/or C) The interstitial elements are not distributed evenly but laced in the grain boundary, which weakens the overall materials properties. Accordingly, refractory alloys have very tight, not to exceed, interstitial contents tolerances in the wrought form.

Solid solution strengthened refractory alloys can be, in theory, strengthened by dispersoids. However, in reality, it has never been achieved because of the difficulty to distribute proper dispersoids in the melting process, the poor low-temperature workability of refractory alloys, which limit its ability to homogenize, and the high temperature oxidation tendency. These qualities all make the process of strengthening refractory alloys using dispersoids impossible to achieve.

Accordingly, current practice in the art of additive manufacturing is to maintain oxygen and contaminants within the sintering chamber at or below certain levels. For example, EP3368312 teaches that a gas management system maintains gaseous oxygen within the interior of the enclosure at or below a limiting oxygen concentration equivalent to the atmospheric level. This is thought to be important for many reasons but mostly to prevent contamination. References like U.S. Patent Publication 2018/0126650 point out that oxygen and or nitrogen will potentially contaminate the additive manufacturing process.

Additive manufacturing is a rapidly growing industry and there is a need to be able to create stronger materials and alloys that can be used with the additive manufacturing process. To this end, there is a great need to figure out methods and processes to create stronger parts using the additive manufacturing process. Stronger parts typically result from stronger alloys and thus, there is a need for stronger alloys, particularly stronger refractory alloys, for use with the additive manufacturing process.

SUMMARY OF THE INVENTION the present invention provides improved methods of manufacturing powders for use in additive manufacturing and improved methods for manufacturing or fabricating objects using additive manufacturing. In preferred embodiments, the methods of fabricating an object using additive manufacturing comprise selecting a refractory alloy powder from the group consisting of Niobium, Rhenium, Tantalum, Molybdenum and Tungsten alloy powders.

In one embodiment, once a powder is selected, the powder is pretreated to increase the oxygen content to between 500 ppm and 3000 ppm or to increase the nitrogen content to between 250 ppm and 1500 ppm or both. Increasing the oxygen and/or nitrogen is achieved by surface oxidation in a controlled inert atmosphere having controlled amounts of oxygen and/or nitrogen injected thereinto.

After the powder is pretreated, a layer of the refractory alloy powder is created in an environmentally controlled inert gas chamber of an additive manufacturing machine and having a suitable quantity of oxygen and/or nitrogen introduced into chamber by any suitable means. The environment is controlled in the chamber to be between 500 ppm and 2000 ppm oxygen. Then the layer is exposed to a transient moving or stationary energy source for melting and solidifying the layer. Finally, dispersoids are formed in situ in the layer with diameters between 1 micron and 10 microns.

In preferred embodiments, the environmentally controlled chamber may also be adjusted to be between 250 ppm and 1000 ppm nitrogen.

The depositing of powder and the melting and solidifying of the layers is repeated until the object is created.

For a more complete understanding of the present invention, reference is made to the following detailed description and accompanying drawing.

DETAILED DESCRIPTION OF THE INVENTION

Despite the fact that it is known that the inclusion of interstitial elements causes contamination in refractory alloys, contrary thereto, it has now been found that if done correctly, elevated levels of contamination from interstitial elements such as oxygen, nitrogen and carbon introduced into the refractory alloy powder can actually provide a benefit in the additive manufacturing process.

By intentionally, adding oxygen and/or nitrogen above the typical specified limit, for example double the industry standard oxygen content, the contaminants create oxides and/or nitrides dispersoids that can be distributed evenly throughout the body of additively produced objects.

Figure 1:
FIG. 1 illustrates an extremely close up optical image of the microstructure of annealed Nb C103 (wrought materials).
Figure 2:
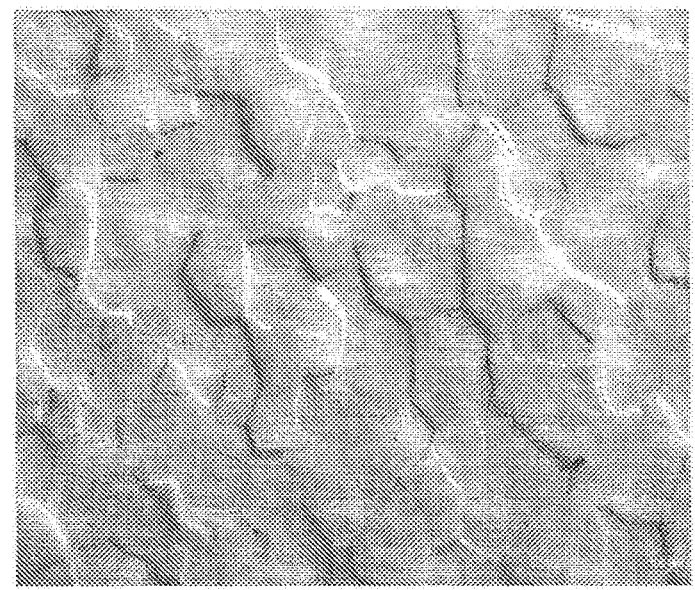
FIG. 2. illustrates an extremely close up optical image of the microstructure of Nb C103 after heating at 2,900° F. for two hours.

The creation and addition of homogenous dispersoids creates a stable microstructure at elevated temperatures. FIG. 1 illustrates an extremely close up optical image of the microstructure of annealed Nb C103 (wrought material). FIG. 2. illustrates an extremely close up optical image of the microstructure of Nb C103 after heating at 2900° F. for two hours. As may be seen in FIG. 2, the exposure to heat creates significant grain coarsening, grain growth, in the wrought material.

Figure 3:
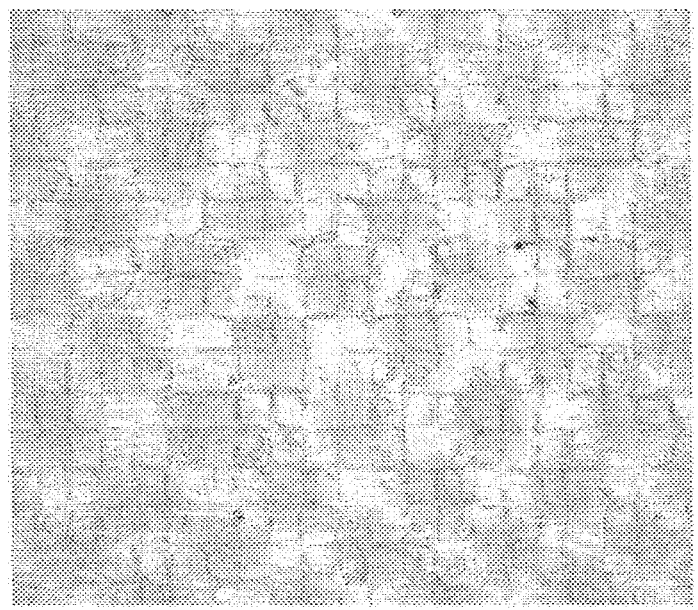
FIG. 3 illustrates an extremely close up optical image of the microstructure of annealed Nb C103 that has been printed using the additive manufacturing techniques taught herein.
Figure 4:
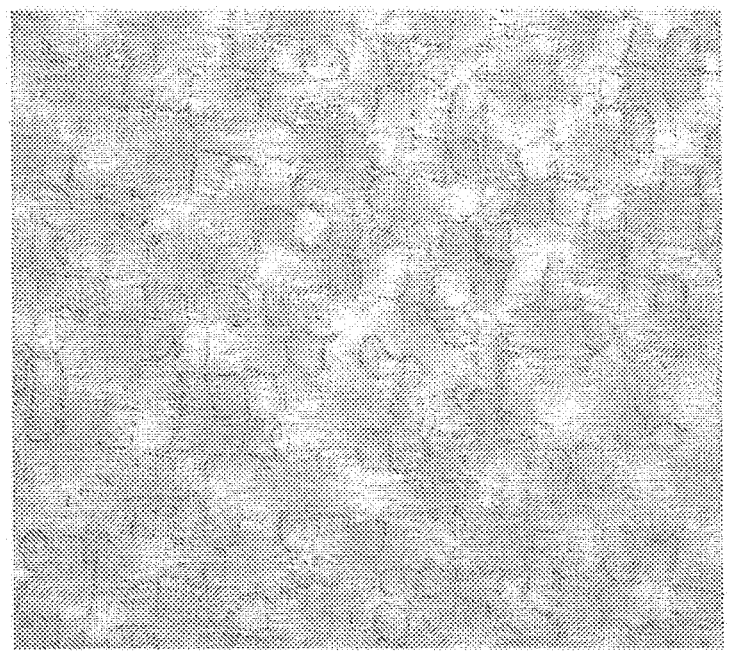
FIG. 4. illustrates an extremely close up optical image of the microstructure of Nb C103 that has been printed using the additive manufacturing techniques taught herein after heating at 2,900° F. for two hours.

FIG. 3 illustrates an extremely close up optical image of the microstructure of annealed Nb C103 that has been printed using the additive manufacturing techniques taught herein. FIG. 4 illustrates the material of FIG. 3 after heating at 2900° F. for two hours. As may be seen in FIG. 4, the printed microstructure remains intact. In FIG. 4, there is no grain growth. The lack of grain growth means there is a stable microstructure and thus, stable mechanical properties.

The Nb C103 that has been printed with the methods taught herein has shown amazingly high temperature grain stability that is not naturally found in refractory alloys. In addition, testing has revealed that refractory alloys that are printed with the techniques taught herein show exceptional tensile strength at elevated temperature while remaining ductile.

As just one example of the better strength retention, at 2400° F., NB C103 printed with the techniques taught herein with dispersoids, exhibited 1.8 times higher strength than the wrought counterpart.

In preferred embodiments, a process for additive manufacturing of an oxide and/or nitride enriched metal alloy powder, is provided. In preferred embodiments, the process comprises: (a) providing an oxide and/or nitride enriched metal alloy powder precursor or pretreated powder containing one or more metals oxides or nitrides; (b) depositing a first amount of the powder into an inert atmosphere chamber provided in an additive manufacturing machine; (c) exposing the first amount of said oxide and/or nitride enriched metal alloy powder in an inert atmosphere to a transient moving or stationary energy source for melting and solidifying a first layer, and layer by layer thereafter.

The oxide and/or nitrides added to the metal alloy powder generates dispersoids within the metal alloy when subjected to the transient energy source of the additive manufacturing process. The resulting metal alloy has a microstructure with oxide and nitride dispersoids.

In preferred embodiments, additional oxygen or nitrogen are added, or the levels available are maintained at a constant or elevated level, during the entire additive manufacturing process. Adding and/or maintaining higher levels of oxygen or nitrogen during the additive manufacturing process causes very stable oxides or nitrides to form in the material. These oxides and nitrides dispersoids form during the high temperature melting process where certain elements react to the oxygen and/or nitrogen to form the fine oxides and nitrides particles that rapidly solidify. These dispersoids are dispersed in the solid solution to provide the higher temperature stability and the extra strength in the material when it cools. The process forms in-situ oxides or nitrides and distributes them evenly/depreciatively throughout the solid solution matrix to stabilize materials at elevated temperatures and provide strength at temperature.

In preferred embodiments, the dispersoids have diameters in the range of 1 micron to 10 microns. In an even more preferred embodiment, the dispersoids have diameters in the range of 1 micron to 5 microns. In yet and even more preferred embodiment, the dispersoids have diameters in the range of 2 microns to 5 microns.

The elevated nitrogen or oxygen levels are preferably maintained during the entire additive manufacturing process. Adding nitrogen or oxygen during the additive manufacturing process is contrary to the normal thinking in the industry and the resulting strengthening that occurs is an unexpected result. Typically, the entire additive manufacturing process (printing process) is performed in an inert gas to protect the metal from coming in contact with and reacting with oxygen, or to lessor degree nitrogen. Alloys have strengthening elements such as titanium and aluminum which have a high affinity to oxygen. Once exposed to oxygen, oxides form and these oxides neutralize the effectiveness of the strengthening elements.

As noted above, in the embodiments taught herein, a higher volume or fraction of fine oxides is promoted (as long as they are stable oxides and are distributed evenly/discursively). These can act to pin the dislocation/grain boundary movement to prevent grain growth in size when exposed to high temperature and accordingly, result in a stronger material.

This invention also has implications for the manufacture of powders for use in the additive manufacturing process. Currently, the manufacture of powders for use with the additive manufacturing process is focused on, and struggling with, the reduction of oxygen content in the powders. With the new additive manufacturing processes disclosed herein, gas atomized powders with higher oxygen and/or nitrogen content can be used.

Currently, due to the reactivity of the refractory alloys, the standard process of gas atomization produced powders has 400 ppm-450 ppm oxygen or higher. The Aerospace Material Specification list the requirements of oxygen and nitrogen for niobium alloy bars, rods and extrusions at 225 ppm maximum for oxygen and 150 ppm maximum for nitrogen. Accordingly, the powders are already out of specification and powder producers are constantly trying to reduce the oxygen and nitrogen contents.

The powder manufacturing process industry is struggling to reduce oxygen in the powders to meet the specification requirements. According to the present invention, of the additive manufacturing processes disclosed may increase oxygen/nitrogen in the powders to achieve our goal. In preferred embodiments, powders for use in the additive manufacturing process may have oxygen contents greater than 250 ppm. In yet other embodiments, the powders may have oxygen content in the range of between 500 ppm and 1000 ppm. In yet other embodiments, the powders may have an oxygen content of 500 ppm or greater. In yet other embodiments, the powders may have an oxygen content between 500 ppm and 3000 ppm. In yet other embodiments, the powders may have greater than 500 ppm of oxygen. In yet other embodiments, the powders may have between 1000 ppm and 2000 ppm of oxygen. In other embodiments, the powder may have from about 900 ppm to about 1100 ppm of oxygen. In yet other embodiments, the powders may have between 500 ppm and 1500 ppm of oxygen. In yet other embodiments, the oxygen content may be between 750 ppm and 1500 ppm. In still yet other embodiments, the oxygen content may be between 750 ppm and 2500 ppm.

In preferred embodiments, the nitrogen content in pretreated powder may be 50% of the oxygen levels disclosed above. In preferred embodiments, powders for use in the additive manufacturing process may have a nitrogen content greater than 125 ppm. In yet other embodiments, the powders may have a nitrogen content in the range of between 250 ppm and 500 ppm. In yet other embodiments, the powders may have a nitrogen content of 250 ppm or greater. In yet other embodiments, the powders may have a nitrogen content between 250 ppm and 1500 ppm. In yet other embodiments, the powders may have a content of greater than 250 ppm of nitrogen. In yet other embodiments, the powders may have between 500 ppm and 1000 ppm nitrogen. In other embodiments, the powder may have between 450 ppm and 550 ppm of nitrogen. In yet other embodiments, the powders may have between 250 ppm and 750 ppm of nitrogen. In yet other embodiments, the nitrogen content may be between 375 ppm and 750 ppm. In still yet other embodiments, the nitrogen content may be between 375 ppm and 1250 ppm.

In preferred embodiments, between 0.05% to 0.2% oxygen, which is 500 ppm to 2000 ppm in the processing gas, i.e., the gas in the chamber, was used. Using 0.05% to 0.2% oxygen in the processing gas resulted in 700 ppm in the sold solution or higher. Maintaining this elevated level of oxygen during the entire additive manufacturing process has resulted in a stronger final material.

However, in other embodiments, other elevated levels of oxygen can be used including anything great that 0%. In some embodiments, between 0 and 0.2% is used. In other embodiments, between 0 and 1% oxygen may be used. In yet other embodiments, between 0.1% and 0.3% may be used. In still yet other embodiments, between 0.1% and 0.5% may be used. In still yet other embodiments between 0% and 3% may be used.

In preferred embodiments, the nitrogen content in the environmentally controlled portion of the additive manufacturing machine may be 50% of the oxygen levels disclosed above. In preferred embodiments, 0.025% to 0.1% nitrogen, which is 250 ppm to 1000 ppm in the processing gas, was used. Using 0.025% to 0.1% nitrogen in the processing gas resulted in 350 ppm in the sold solution or higher. Maintaining this elevated level of nitrogen during the entire additive manufacturing process has resulted in a stronger final material. However, in other embodiments, other elevated levels of nitrogen can be used including anything great that 0%. In some embodiments, between 0 and 0.1% is used. In other embodiments, between 0 and 0.5% nitrogen may be used. In yet other embodiments, between 0.05% and 0.15% may be used. In still yet other embodiments, between 0.05% and 0.25% may be used. In still yet other embodiments between 0% and 1.5% may be used.

In preferred embodiments, pretreatment of nominal metal powder under an oxygen and/or nitrogen environment above activation energy forms a layer of surface oxide or nitride. After pretreatment, the metal powders are exposed to either a transient energy source or stationary energy source for melting and solidifying in an inert atmosphere an oxygen and/or nitrogen partial pressure environment.

In some embodiments, pretreatment of the metal powders includes applying a heat source or heating the powders for a period of time for about 20 to about 120 minutes in a controlled inert gas atmosphere having controlled amounts of oxygen and/or nitrogen added thereto. In preferred embodiments, the metal powders are heated between 250° F. and 750° F. Even more preferably the metal powders are heated between 400° F. and 600° F. and even more preferably between 450° F. and 600° F. The application of heat to the powders as part of the pretreatment process accelerates oxidation.

In preferred embodiments, the additional heat is applied to the powder during the pretreatment stage for between 20 minutes and 120 minutes. Even more preferably, the heat is applied for between 40 minutes and 120 minutes. Ideally, the heat is applied for at least 60 minutes at a minimum.

As noted above, in other embodiments, nominal metal powders, i.e., those without pretreatments of enriching with oxygen and nitrogen, are exposed to either a transient or stationary energy source for melting, which is predominantly an inert gas and solidifying the powder in an oxygen and/or nitrogen partial pressure environment. The environment may be maintained with higher levels of oxygen of about 2000 ppm and minor amounts of nitrogen and/or nitrogen as taught herein.

Among the useful inert gasses are argon, helium, neon, krypton and the like which are used in both the pretreatment and manufacturing stages. Preferably, helium is used.

Although the examples used herein are directed to Nb C103, any high temperature refractory metal and/or refractory metal alloy powders may be used without departing from the scope of the present inventions.

What is claimed is:

1. A method of fabricating an object from refractory powder alloys using additive manufacturing comprising:
   (a) selecting a refractory alloy powder from the group consisting of niobium refractory alloy powder, rhenium refractory alloy powder, tantalum refractory alloy powder, molybdenum refractory alloy powder and tungsten refractory alloy powder;
   (b) pretreating the refractory alloy powder in an environmentally controlled inert gas chamber by heating the refractory alloy powder in an oxygen and nitrogen containing atmosphere at a temperature between about 250° F. to about 750° F. for a period of between about 20 to 120 minutes to increase an oxygen content in the refractory alloy powder to between 500 ppm and 3000 ppm or to increase a nitrogen content in the refractory alloy powder to between 250 ppm and 1500 ppm; and
   (c) exposing the refractory alloy powder after pretreating to a transient energy source to melt and solidify the refractory alloy powder;
   wherein dispersoids are formed in situ in a layer with the dispersoids having diameters of between 1 micron and 10 microns.

2. The method of claim 1 further comprising: adjusting the environmentally controlled inert gas chamber to have between 250 ppm and 1000 ppm nitrogen.

3. The method of claim 1 further comprising adjusting the oxygen content of the environmentally controlled inert gas chamber to be between 500 ppm and 2000 ppm.

4. The method of claim 1, wherein the refractory alloy powder is niobium refractory alloy powder.

5. The method of claim 1, wherein the refractory alloy powder is tungsten refractory alloy powder.

US 12,667,888 B2

7

6. The method of claim 1, wherein the refractory alloy powder is rhenium refractory alloy powder.

7. The method of claim 1, wherein the refractory alloy powder is tantalum refractory alloy powder.

8. The method of claim 1, wherein the refractory alloy powder is molybdenum refractory alloy powder.

9. The method of claim 1, wherein the oxygen content of the refractory alloy powder is between 750 ppm and 1500 ppm.

10. The method of claim 1 which further comprises repeating step (c) until the object is fabricated.

11. The method of claim 1, wherein the niobium refractory alloy powder is niobium alloy C-103.

12. The method of claim 1, wherein the transient energy source is a moving energy source.

13. The method of claim 1, wherein the transient energy source is a stationary energy source.

14. The method of claim 1, wherein the transient energy source is a laser beam.

\* \* \* \* \*

8